US012613349B2

(12) United States Patent
Jacob et al.

(10) Patent No.: US 12,613,349 B2
(45) Date of Patent: Apr. 28, 2026

(54) FLAT PANEL X-ray DETECTOR FOR COMPUTED TOMOGRAPHY

(71) Applicant: GE Precision Healthcare LLC, Wauwatosa, WI (US)

(72) Inventors: Biju Jacob, Niskayuna, NY (US); Uwe Wiedmann, Clifton Park, NY (US); Douglas Albagli, Clifton Park, NY (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 103 days.

(21) Appl. No.: 18/097,841

(22) Filed: Jan. 17, 2023

(65) Prior Publication Data

US 2024/0241272 A1     Jul. 18, 2024

(51) Int. Cl.
| | |
|---|---|
| *G01T 1/20* | (2006.01) |
| *G01T 1/24* | (2006.01) |
| *G01T 1/29* | (2006.01) |

(52) U.S. Cl.
CPC ............ *G01T 1/20* (2013.01); *G01T 1/20182* (2020.05); *G01T 1/20184* (2020.05); *G01T 1/24* (2013.01); *G01T 1/2985* (2013.01)

(58) Field of Classification Search
CPC ... G01T 1/20; G01T 1/20182; G01T 1/20184; G01T 1/24; G01T 1/2985; G01T 1/20183
See application file for complete search history.

(56) References Cited

U.S. PATENT DOCUMENTS

| | | | |
|---|---|---|---|
| 6,654,443 | B1 | 11/2003 | Hoffman |
| 6,717,150 | B2 | 4/2004 | Hoffman |
| 6,718,010 | B2 | 4/2004 | Petrick et al. |

(Continued)

FOREIGN PATENT DOCUMENTS

| | | | |
|---|---|---|---|
| CN | 1304047 | 7/2001 | |
| CN | 101005086 A | * 7/2007 | ............. A61B 6/548 |

(Continued)

OTHER PUBLICATIONS

EP application 24150703.7 filed Jan. 8, 2024—partial Search Report issued May 31, 2024; 12pages.

(Continued)

*Primary Examiner* — Carolyn Fin
(74) *Attorney, Agent, or Firm* — Fletcher Yoder, P.C.

(57) ABSTRACT

An X-ray detector for a computed tomography (CT) imaging system is provided. The X-ray detector includes a plurality of detector modules. Each detector module of the plurality of detector modules includes a scintillator layer configured to convert X-ray photons into lower energy light photons. Each detector module of the plurality of detector modules also includes a light imager layer configured to convert the light photons into electrons, wherein the light imager layer includes a light imager panel comprising an array of photodiodes. Each detector module of the plurality of detector modules further includes a readout device that converts the electrons into digitized pixel values, wherein each photodiode of the array of photodiodes is coupled to a respective dedicated readout channel of the readout device via a respective dedicated data line, and the readout device is configured to continuously directly readout the electrons from the array of photodiodes.

17 Claims, 14 Drawing Sheets

(56)     References Cited

U.S. PATENT DOCUMENTS

| | | | | |
|---|---|---|---|---|
| 6,873,679 | B2 | 3/2005 | Hagiwara | |
| 7,010,084 | B1 * | 3/2006 | Moritake | G01T 1/2985 |
| | | | | 378/19 |
| 7,054,409 | B2 | 5/2006 | Ross et al. | |
| 7,466,161 | B2 | 12/2008 | Gardner et al. | |
| 7,479,640 | B2 * | 1/2009 | Misawa | H04N 25/78 |
| | | | | 250/363.08 |
| 2002/0153492 | A1 * | 10/2002 | Sekine | G01T 1/20183 |
| | | | | 250/370.11 |
| 2006/0002508 | A1 | 1/2006 | Yahata | |
| 2008/0310585 | A1 * | 12/2008 | Ikhlef | H04N 5/32 |
| | | | | 378/19 |
| 2009/0080601 | A1 | 3/2009 | Tkaczyk | |
| 2010/0288948 | A1 | 11/2010 | Schmidt | |
| 2011/0079727 | A1 * | 4/2011 | Prescher | G01T 1/248 |
| | | | | 250/370.1 |
| 2013/0058452 | A1 | 3/2013 | Levene | |
| 2017/0278277 | A1 * | 9/2017 | Morf | A61B 6/585 |
| 2021/0223414 | A1 | 7/2021 | Harmon | |
| 2022/0357469 | A1 | 11/2022 | Fujita | |

FOREIGN PATENT DOCUMENTS

| | | |
|---|---|---|
| CN | 113437098 | 9/2021 |
| EP | 1411833 B1 | 4/2008 |
| JP | H06120474 A | 4/1994 |
| JP | 2003066149 A | 3/2003 |
| JP | 2017205326 A | 11/2017 |
| JP | 2021110741 A | 8/2021 |

OTHER PUBLICATIONS

EP application 24150703.7 filed Jan. 8, 2024—extended Search Report issued Oct. 8, 2024; 13 pages.

JP application 2024-000546 filed Jan. 5, 2024—Office Action issued Feb. 26, 2025; Machine Translation; 8 pages.

JP2003066149 English Abstract; Espacenet.com May 23, 2025; 1 page.

JP2017205326 English Abstract; Espacenet.com May 23, 2025; 1 page.

JP2021110741 English Abstract; Espacenet.com May 23, 2025; 1 page.

JPH06120474 English Abstract; Espacenet.com May 23, 2025; 1 page.

* cited by examiner

120

| Trace gap (μm) | Trace height (μm) | Trace width (μm) | Nitride thickness (μm) | Capacitance/ μm | Trace length (cm) | Trace capacitance (pF) |
|---|---|---|---|---|---|---|
| 6 | 0.5 | 6 | 2 | 4.23E-16 | 2 | 8.5 |
| 6 | 0.5 | 3 | 2 | 2.80E-16 | 2 | 5.6 |
| 6 | 0.25 | 6 | 2 | 3.70E-16 | 2 | 7.4 |
| 6 | 0.25 | 3 | 2 | 2.45E-16 | 2 | 4.9 |
| 3 | 0.5 | 6 | 2 | 4.29E-16 | 2 | 8.6 |
| 3 | 0.5 | 3 | 2 | 2.85E-16 | 2 | 5.7 |
| 3 | 0.25 | 6 | 2 | 3.75E-16 | 2 | 7.5 |
| 3 | 0.25 | 3 | 2 | 2.50E-16 | 2 | 5.0 |

FIG. 11

ASICs can be configured for different read-out modes

High-resolution center zone readout

Standard-resolution full coverage readout

FLAT PANEL X-ray DETECTOR FOR COMPUTED TOMOGRAPHY

BACKGROUND

The subject matter disclosed herein relates to X-ray detectors and, more particularly, to a flat panel X-ray detector for computed tomography (CT).

Non-invasive imaging technologies allow images of the internal structures or features of a subject (patient, manufactured good, baggage, package, or passenger) to be obtained without physical contact.

For example, in X-ray-based imaging technologies, X-ray radiation penetrates a subject of interest, such as a human patient, and a portion of the radiation impacts a detector where the intensity data is collected. In digital X-ray systems, a detector produces signals representative of the amount or intensity of radiation impacting discrete pixel regions of a detector surface. The signals may then be processed to generate an image that may be displayed for review.

In one such X-ray based technique, known as computed tomography (CT), a scanner may project fan-shaped or cone-shaped X-ray beams from an X-ray source at numerous view angle positions about an object being imaged, such as a patient. The X-ray beams are attenuated as they traverse the object and are detected by a set of detector elements which produce signals representing the intensity or number of incident X-rays reaching the detector. The signals are processed to produce data representing the line integrals of the linear attenuation coefficients of the object along the X-ray paths. These signals are typically called "projection data" or just "projections". By using reconstruction techniques, such as filtered backprojection, images may be generated that represent a cross sectional slice or three-dimensional volume of a region of interest of the patient or imaged object. In a medical context, pathologies or other structures of interest may then be located or identified from the reconstructed images or rendered volume.

Despite being the work horse of modern medical diagnostic procedures, CT systems are expensive and not accessible for a large fraction of the population. The X-ray detector accounts for a large fraction of the CT system cost. Curved X-ray detectors are typically utilized in CT systems. Although flat panel X-ray panels have been considered earlier in CT systems for their potentially higher spatial resolution and lower cost benefits, they have not had an impact on the market due to their inferior image quality compared to standard CT systems. The main reasons for the subpar image quality are the low X-ray stopping power of the flat panel scintillators in the CT spectrum, image lag and gain hysteresis arising from the scintillators, amorphous silicon (a-Si) thin-film transistors and diodes, crosstalk between pixels, and large channel-to-channel variation due to thin-film transistor switching noise.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosed subject matter may encompass a variety of forms that may be similar to or different from the embodiments set forth below.

In one embodiment, an X-ray detector for a computed tomography (CT) imaging system is provided. The X-ray detector includes a plurality of detector modules. Each detector module of the plurality of detector modules includes a scintillator layer configured to convert X-ray photons into lower energy light photons. Each detector module of the plurality of detector modules also includes a light imager layer configured to convert the light photons into electrons, wherein the light imager layer includes a light imager panel including an array of photodiodes. Each detector module of the plurality of detector modules further includes a readout device that converts the electrons into digitized pixel values, wherein each photodiode of the array of photodiodes is coupled to a respective dedicated readout channel of the readout device via a respective dedicated data line, and the readout device is configured to continuously directly readout the electrons from the array of photodiodes.

In an additional embodiment, a computed tomography (CT) imaging system is provided. The CT imaging system includes a radiation source configured to emit an X-ray beam. The CT system also includes a flat panel X-ray detector. The flat panel X-ray detector includes a scintillator layer configured to convert X-ray photons into lower energy light photons. The flat panel X-ray detector also includes a light imager layer configured to convert the light photons into electrons, wherein the light imager layer includes a light imager panel including an array of photodiodes. The flat panel X-ray detector further includes a plurality of readout devices that converts the electrons into digitized pixel values, wherein each photodiode of the array of photodiodes is coupled to a respective dedicated readout channel of a respective readout device of the plurality of readout devices via a respective dedicated data line, and the plurality of readout devices are configured to continuously directly readout the electrons from the array of photodiodes.

In a further embodiment, a flat panel X-ray detector for a computed tomography (CT) imaging system is provided. The flat panel X-ray detector includes a scintillator layer configured to convert X-ray photons into lower energy light photons. The flat panel X-ray detector also includes a light imager layer configured to convert the light photons into electrons, wherein the light imager layer includes a light imager panel including an array of photodiodes, and the light imager panel lacks both transistors and scan line. The flat panel X-ray detector further includes a readout device that converts the electrons into digitized pixel values, wherein each photodiode of the array of photodiodes is coupled to a respective dedicated readout channel of the readout device via a respective dedicated data line, and the readout device is configured to continuously directly readout the electrons from the array of photodiodes. Each photodiode of the array of photodiodes includes amorphous silicon and is configured to act as a direct current source to the readout device, and wherein each respective dedicated data line includes a trace, and each trace of each respective dedicated data line is located underneath a gap in the scintillator layer.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 11 is a table relating dimensions of the traces in FIG. 9 to capacitance, in accordance with aspects of the present disclosure;

DETAILED DESCRIPTION

Figure 1:
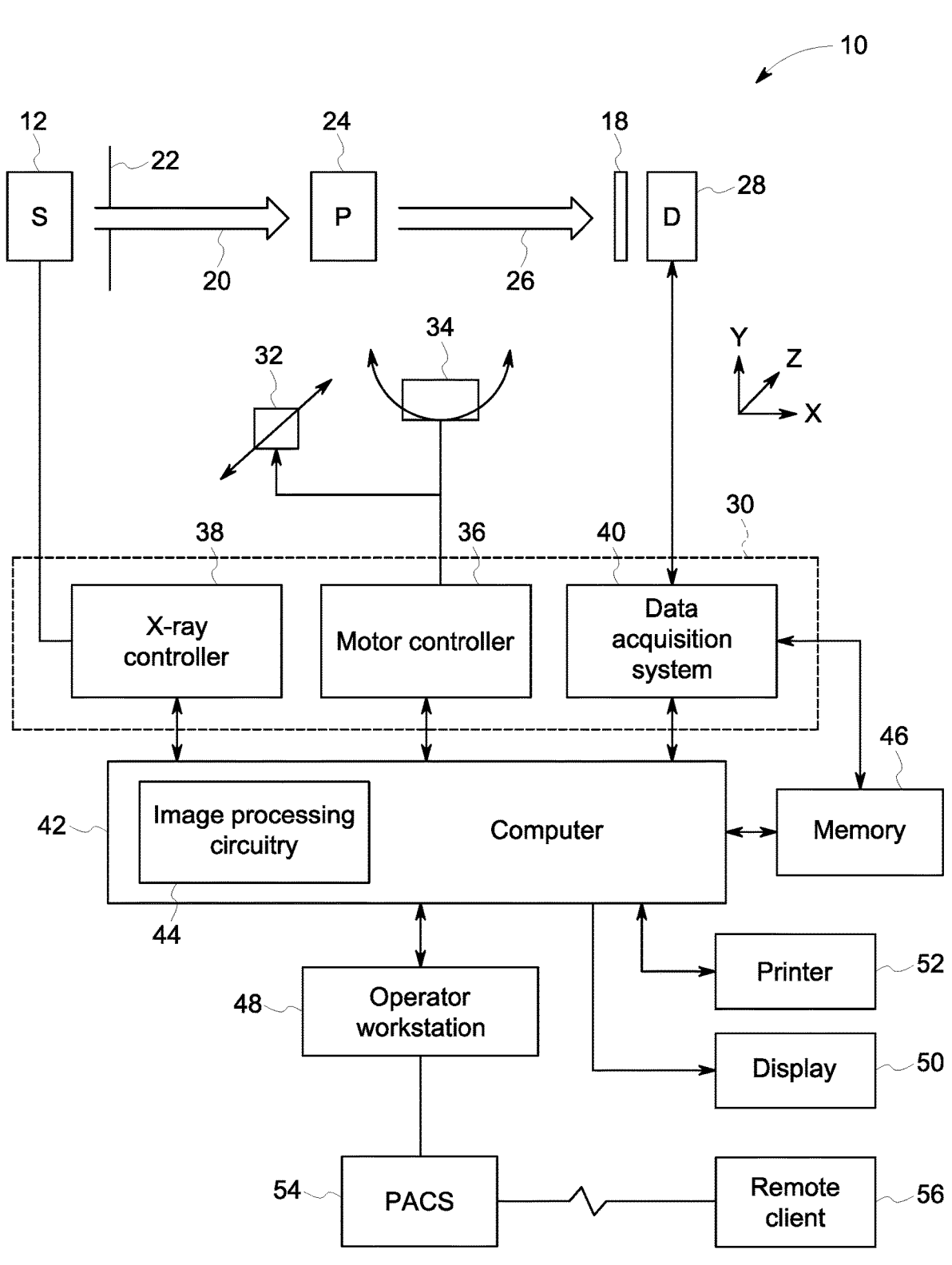
FIG. 1 depicts components of a computed tomography imaging system, in accordance with certain aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the following discussion is generally provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as the non-destructive inspection of manufactured parts or goods (i.e., quality control or quality review applications), and/or the non-invasive inspection of packages, boxes, luggage, and so forth (i.e., security or screening applications). In general, the present approaches may be desirable in any imaging or screening context in which a flat panel X-ray detector is utilized.

The present disclosure provides an X-ray detector (e.g., flat panel X-ray detector) for a computed tomography system. The detector architecture of the disclosed embodiments leverages the low cost and high spatial resolution of flat panel X-ray detectors while aiming to retain standard computed tomography detector image quality. In particular, a computed tomography scintillator and readout device (e.g., application-specific integrated circuit (ASIC)) are utilized with a flat panel diode array with direct read of the individual diodes in the flat panel (instead of utilizing a switched matrix flat panel diode array).

In certain embodiments, the X-ray detector includes a plurality of detector modules that form the imager. In certain embodiments, the imager of the X-ray detector (in a monolithic approach) is made as a single imager panel (e.g., flat imager panel). Each detector module of the plurality of detector modules (or the single imager panel) includes a scintillator layer configured to convert X-ray photons into lower energy light photons. Each detector module of the plurality of detector modules (or the single imager panel) also includes a light imager layer configured to convert the light photons into electrons, wherein the light imager layer includes a light imager panel including an array of photodiodes (e.g., photodiodes made of amorphous silicon). Each detector module of the plurality of detector modules further includes a readout device that converts the electrons into digitized pixel values, wherein each photodiode of the array of photodiodes is coupled to a respective dedicated readout channel (e.g., current integrating amplifier to avoid charge redistribution issues) of the readout device via a respective dedicated data line, and the readout device is configured to continuously directly readout the electrons from the array of photodiodes. In certain embodiments, the single imager panel includes a number of readout devices that are coupled to the photodiodes to provide sufficient dedicated readout channels. Each photodiode is configured to act as a direct current source to the readout device. The light imager layer also lacks both transistors and scan lines making the X-ray detector significantly simpler than a standard X-ray panel. In addition, the disclosed embodiments provide an X-ray detector at significantly less cost without sacrificing image quality and without requiring an extensive field of view (FOV).

With the preceding discussion in mind, FIG. 1 illustrates an embodiment of an imaging system 10 for acquiring and processing image data in accordance with structures and approaches discussed herein. That is, the depicted type of imaging system 10 is an example of one type of imaging system that may benefit from or otherwise utilize components made in accordance with the techniques described herein. Though, as noted herein, other types of systems (e.g., non-imaging systems, non-medical systems, and so forth) may also utilize components made in accordance with the techniques described herein.

In the illustrated example, system 10 is a computed tomography (CT) system designed to acquire X-ray projection data and to reconstruct the projection data into volumetric reconstructions for display and analysis. The CT imaging system 10 includes one or more X-ray sources 12, such as one or more X-ray tubes or solid-state emission structures which allow X-ray generation at one or more energy spectra during an imaging session.

In certain implementations, the source 12 may be positioned proximate to a pre-patient collimator and/or filter assembly 22 that may be used to steer the X-ray beam 20, to define the shape (such as by limiting off-angle emissions) and/or extent of a high-intensity region of the X-ray beam 20, to control or define the energy profile of the X-ray beam 20, and/or to otherwise limit X-ray exposure on those portions of the patient 24 not within a region of interest. In practice, the filter assembly or beam shaper 22 may be incorporated within the gantry, between the source 12 and the imaged volume.

The X-ray beam 20 passes into a region in which the subject (e.g., a patient 24) or object of interest (e.g., manufactured component, baggage, package, and so forth) is positioned. The subject attenuates at least a portion of the X-ray photons 20, resulting in attenuated X-ray photons 26 that impinge upon a detector 28 (e.g., pixelated detector array 28) formed by a plurality of detector elements (e.g., pixels) arranged in an array. In the depicted example, the attenuated X-ray photons 26 pass through a collimator 18 (e.g., an anti-scatter grid or post-patient collimator) prior to reaching the detector array 28. As discussed herein, the collimator 18 may consist of a plurality of blades or other elements aligned substantially perpendicular to the surface of the detector array 28 and formed from an attenuating material that limit or prevent X-ray photons 26 traveling at off-angles (e.g., scattered X-rays) from reaching the detector array 28. The electrical signals reaching the detector array 28 are detected and processed to generate one or more projection datasets. In the depicted example, the detector 28 is coupled to the system controller 30, which commands acquisition of the digital signals generated by the detector 28.

A system controller 30 commands operation of the imaging system 10 to execute filtration, examination and/or calibration protocols, and may process the acquired data. With respect to the X-ray source 12, the system controller 30 furnishes power, focal spot location, control signals and so forth, for the X-ray examination sequences. In accordance with certain embodiments, the system controller 30 may control operation of the filter assembly 22, the CT gantry (or other structural support to which the X-ray source 12 and detector 28 are attached), and/or the translation and/or inclination of the patient support over the course of an examination.

In addition, the system controller 30, via a motor controller 36, may control operation of a linear positioning subsystem 32 and/or a rotational subsystem 34 used to move the patient 24 and/or components of the imaging system 10, respectively. For example, in a CT system, the radiation source 12 and detector 28 rotate about the object (e.g., patient 24) to acquire X-ray transmission data over a range of angular views. Thus, in a real-world implementation, the imaging system 10 is configured to generate X-ray transmission data corresponding to each of the plurality of angular positions (e.g., 360°, 180°+a fan beam angle ($\alpha$), and so forth) covering an entire scanning area of interest.

The system controller 30 may include signal processing circuitry and associated memory circuitry. In such embodiments, the memory circuitry may store programs, routines, and/or encoded algorithms executed by the system controller 30 to operate the imaging system 10, including the X-ray source 12 and/or filter assembly 22, and to process the digital measurements acquired by the detector 28. In one embodiment, the system controller 30 may be implemented as all or part of a processor-based system.

The source 12 may be controlled by an X-ray controller 38 contained within the system controller 30. The X-ray controller 38 may be configured to provide power, timing signals, and/or focal spot size and spot locations to the source 12. In addition, in some embodiments the X-ray controller 38 may be configured to selectively activate the source 12 such that tubes or emitters at different locations within the system 10 may be operated in synchrony with one another or independent of one another or to switch the source between different energy profiles during an imaging session.

The system controller 30 may include a data acquisition system (DAS) 40. The DAS 40 receives data collected by readout electronics of the detector 28, such as digital signals from the detector 28. The DAS 40 may then convert and/or process the data for subsequent processing by a processor-based system, such as a computer 42. In certain implementations discussed herein, circuitry within the detector 28 may convert analog signals of the detector to digital signals prior to transmission to the data acquisition system 40. The computer 42 may include or communicate with one or more non-transitory memory devices 46 that can store data processed by the computer 42, data to be processed by the computer 42, or instructions to be executed by image processing circuitry 44 of the computer 42. For example, a processor of the computer 42 may execute one or more sets of instructions stored on the memory 46, which may be a memory of the computer 42, a memory of the processor, firmware, or a similar instantiation. By way of example, the image processing circuitry 44 of the computer 42 may be configured to generate a diagnostic image.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data or images, and so forth. Additionally, the system 10 may include a printer 52 coupled to the operator workstation 48 and configured to print any desired measurement results. The display 50 and the printer 52 may also be connected to the computer 42 directly (as shown in FIG. 1) or via the operator workstation 48. Further, the operator workstation 48 may include or be coupled to a picture archiving and communications system (PACS) 54. PACS 54 may be coupled to a remote system or client 56, radiology department information system (RIS), hospital information system (HIS) or to an internal or external network, so that others at different locations can gain access to the image data.

Figure 2:
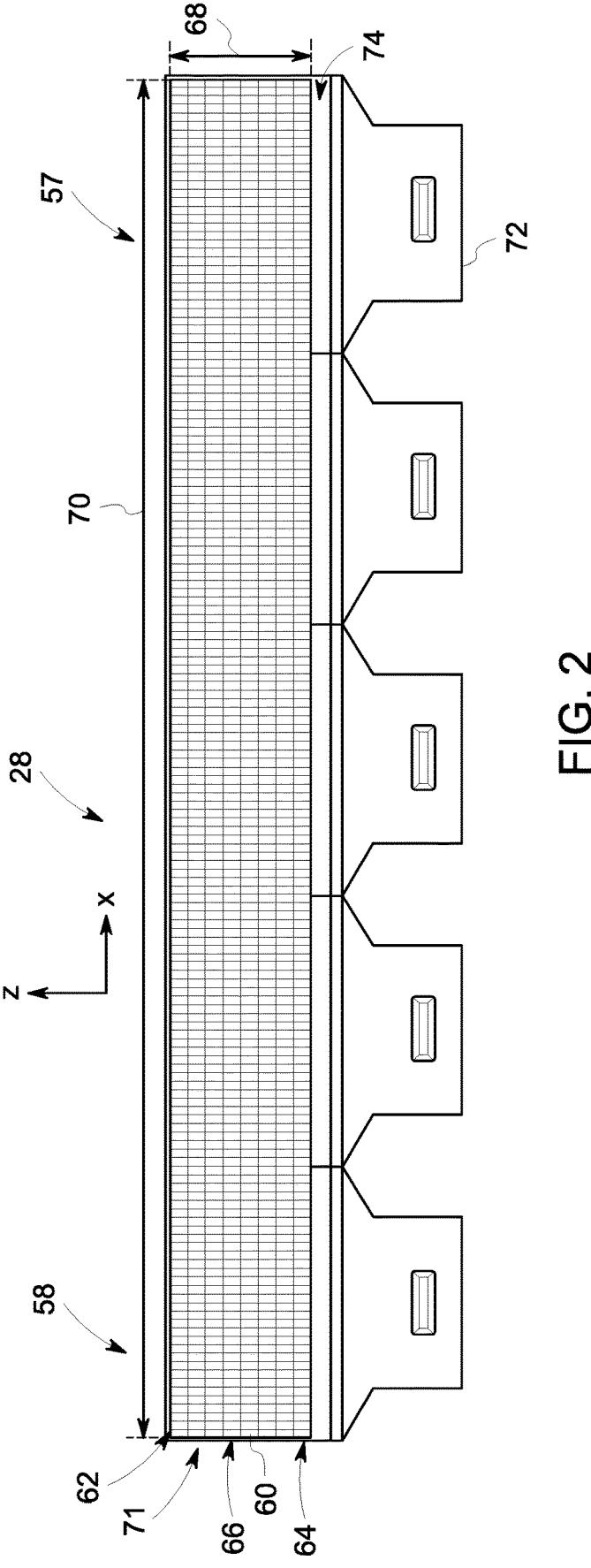
FIG. 2 is a schematic diagram of a top view of an X-ray detector having an imager panel (e.g., light imager panel) having a flat panel architecture, in accordance with aspects of the present disclosure.
Figure 3:
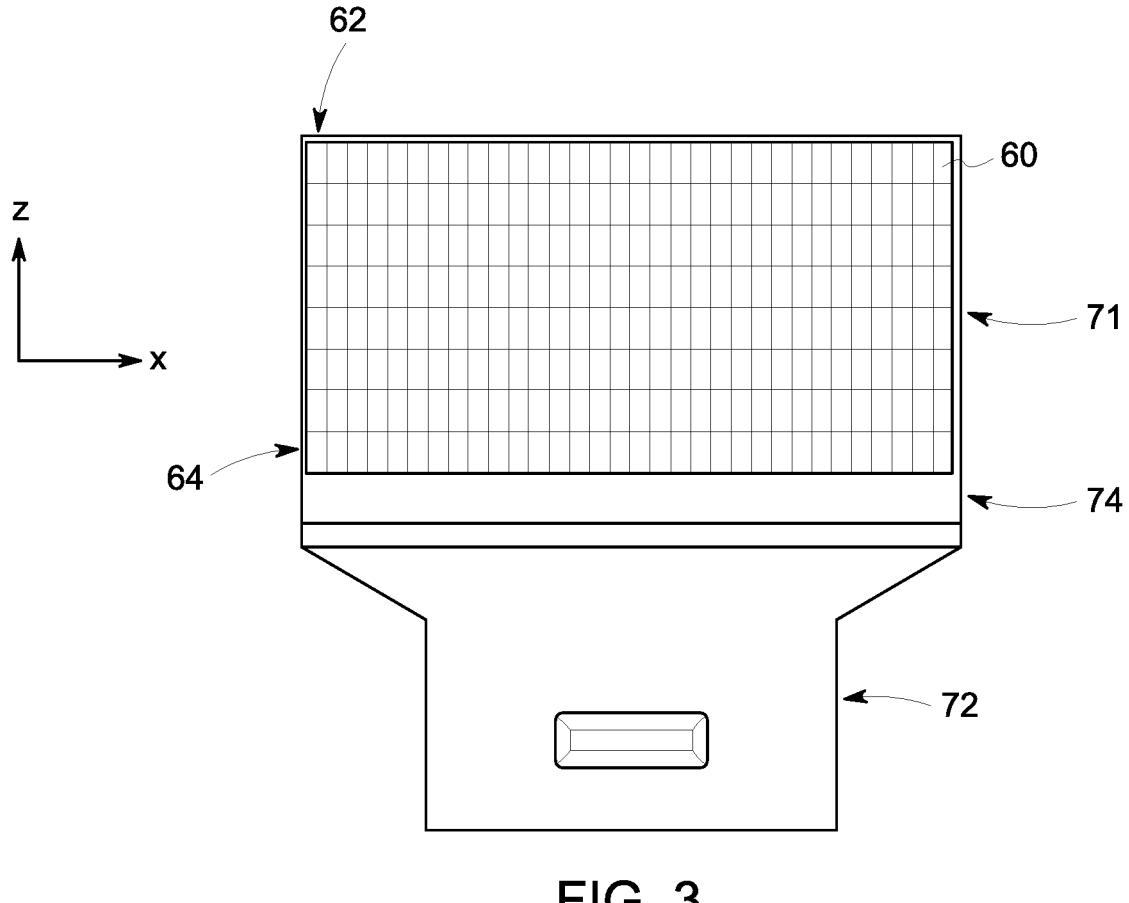
FIG. 3 is a schematic diagram of a top view of a detector module of the X-ray detector in FIG. 2, in accordance with aspects of the present disclosure.
Figure 4:
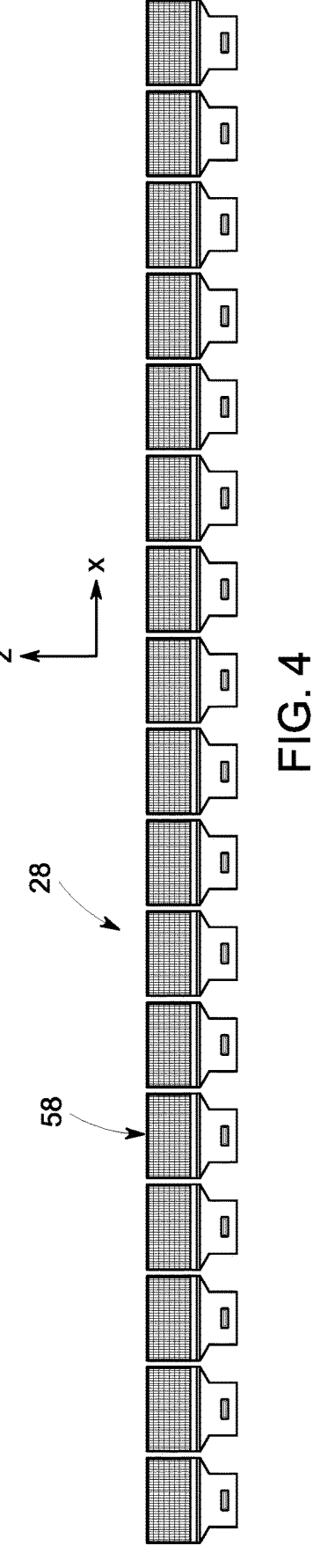
FIG. 4 is a schematic diagram of a top view of a plurality of detector modules (e.g., of the detector module in FIG. 3), in accordance with aspects of the present disclosure.

FIG. 2 is a schematic diagram of a top view of the X-ray detector 28 (e.g., flat panel X-ray detector) having an imager panel 57 (e.g., light imager panel) having a flat panel architecture. The X-ray detector 28 includes a plurality of detector modules 58 that form the imager panel 57. In certain embodiments, the imager panel 57 of the X-ray detector 28 (in a monolithic approach) is manufactured as a single imager panel (e.g., flat imager panel). As described in greater detail later, each detector module 58 (or single imager panel) includes a scintillator layer disposed over a light imager layer. FIG. 3 depicts an individual detector module 58. FIG. 4 depicts a detector module including a plurality of the individual detector modules 58 of FIG. 3. The number of detector modules 58 that form the X-ray detector 28 may vary. As depicted in FIG. 2, the X-ray detector 28 includes 5 detector modules 58. In certain embodiments, the X-ray detector 28 is flat. In certain embodiments, the X-ray detector 28 is curved to match a profile of a gantry rail (where the X-ray detector 28 may be coupled) of a gantry of the CT imaging system.

Each detector module 58 includes a plurality of pixels 60 (e.g., detector elements). As described in greater detail below, each pixel 60 is a photodiode. Each detector module 58 includes a plurality of columns or channels 62 of the pixels 60 extending in the Z-direction. As depicted in FIGS. 2 and 3, each detector module 58 includes 32 channels 62. Each channel 62 includes 8 pixels 60. The number of pixels 60 in each channel 62 may vary. Each detector module 58 includes a plurality of rows 64 of the pixels 60 extending in the X-direction. As depicted in FIGS. 2 and 3, each detector module 58 includes 32 pixels 60. The number of pixels 60 in each row may vary. Co-linear rows 64 of the pixels 60 of all the aligned detector modules 58 form slices 66 of the X-ray detector 28. As depicted in FIG. 2, the X-ray detector 28 includes 8 slices 66. The number of slices 66 in the X-ray detector 28 may vary. The structure of a single imager panel is similar to the structure of the detector modules 58.

A coverage 68 of the X-ray detector 28 may vary. In certain embodiments, the coverage 68 may in the Z-direction. A dimension 70 of the X-ray detector 28 may also vary in the X-direction. The coverage 68 and dimension 70 define an active area 71 for imaging of the X-ray detector 28. An imager panel including the active area 71 and inactive area 74 (including fingers (e.g., contacts)) would be less than 2.5 cm wide. Thus, a 40 cm×40 cm support would enable the manufacturing of approximately 15 imager panels simultaneously. This would reduce costs compared to manufacturing a standard flat panel due to less complexity (as only diodes need to be fabricated; no transistors) and narrower coverage for the imager panels.

Figure 5:
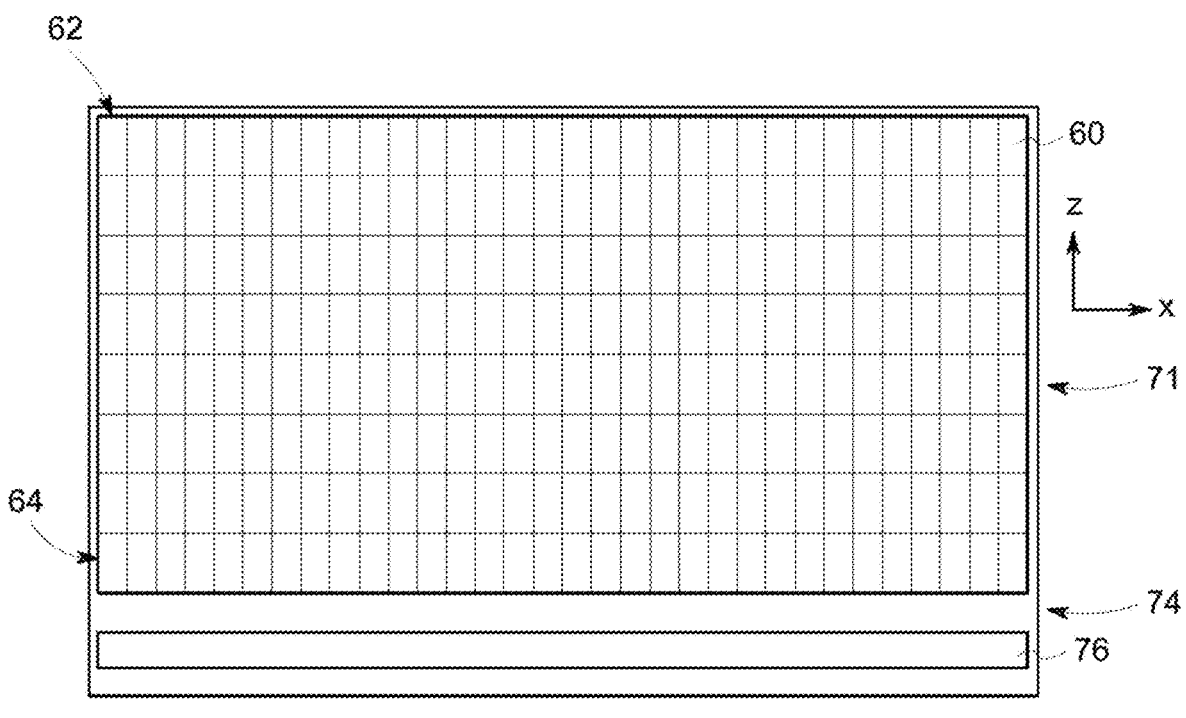
FIG. 5 is a schematic diagram of a top view of the detector module in FIG. 3 without a readout device attached, in accordance with aspects of the present disclosure.

Each pixel 60 of a respective detector module 58 is coupled via a dedicated data line (e.g., metal trace) to a respective dedicated readout channel of a readout electronics or readout device 72 coupled to the detector module 58 to enable parallel readout of the pixels 60. A single readout device 72 is coupled to each detector module 58. In particular, each readout device 72 is coupled to the inactive area 74 (e.g., via a gap pad 76 (see FIG. 5) of the detector module 58. In certain embodiments, the readout device 72 is an application-specific integrated circuit (ASIC). Each readout device 72 (e.g., ASIC) may include 256 readout channels for the 256 pixels in a respective detector module 58. In certain embodiments, each readout channel is a current integrating amplifier. Traces of all the pixels 60 are routed to the same side of the imager panel 57. In certain embodiments (e.g., larger imager panels not using detector modules), the traces of the pixels 60 may be routed to multiple sides. For example, with an imager panel made twice as large in the Z-direction, traces may be routed to opposite sides (e.g., both the positive and negative Z-direction). In certain embodiments, the traces may be routed underneath the gaps (e.g., kerfs) in the scintillator layer between pixels 60. In certain embodiments, the traces may be routed underneath the pixels 60. As each pixel 60 (e.g., photodiode) has a dedicated readout channel (e.g., dedicated ASIC channel), the number of readout devices (e.g., ASICs) increases proportionally to the number of pixels 60.

In certain embodiments, the coverage 68 (and number of slices 66) of the X-ray detector 28 may be increased by adjoining a similar number of additional detector modules 58 in the Z-direction to those detector modules 58 in FIG. 2. The pixels 60 in the additional detector modules 58 will be routed to their respective readout device 72 located on an opposite side of the X-ray detector 28 from those readout devices 72 depicted in FIG. 2.

Figure 6:
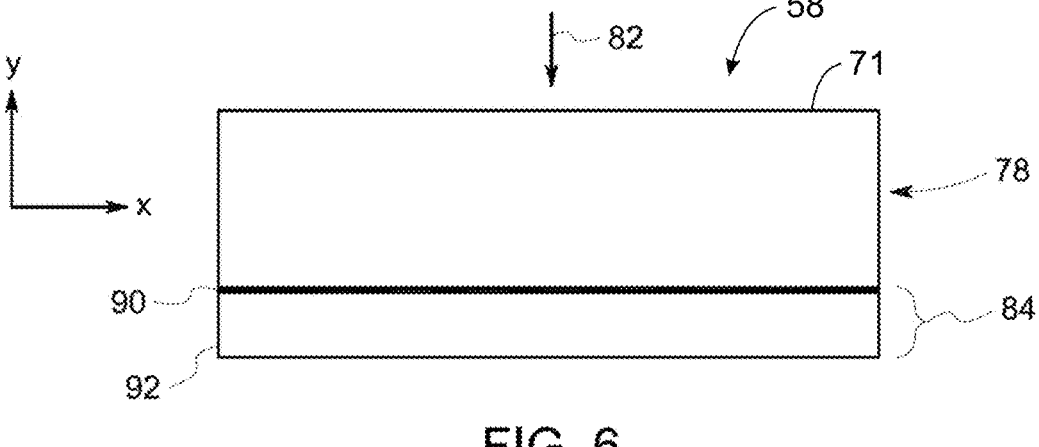
FIG. 6 is a schematic diagram of a side view of an active area of the detector module in FIG. 3, in accordance with aspects of the present disclosure.

FIG. 6 is a schematic diagram of a side view of a portion of the active area 71 of the detector module 58 in FIG. 3. The structure of a single imager panel is similar to the structure of the detector modules 58. The detector module 58 includes a scintillator layer 78 configured to convert X-ray photons into lower energy light photons. For each detector module 58, the scintillator layer 78 is formed by a crystalline scintillator pack. In particular, in certain embodiments, the scintillator pack is made of crystalline gadolinium oxysulfide (GOS). In certain embodiments, the scintillator layer 78 may be made of a scintillator sheet. In certain embodiments, the scintillator layer 78 has a thickness of at least 1.5 mm. In certain embodiments, the thickness of the scintillator layer 78 is approximately 2 mm or greater. If an anti-scatter grid (e.g., collimator 18 in FIG. 1) is utilized, the pitch of the scatter grid may or may not be increased.

The scintillator layer 78 is disposed on (e.g., above relative to a direction the X-rays are being received as indicated by arrow 82) a light imager layer 84. The light imager layer 84 is configured to convert the light photons into electrons. The light imager layer 84 includes a light imager panel. The light imager panel includes a photodiode array 90 (as part of a semiconductor layer) disposed on (e.g., above) a base plate 92. In certain embodiments, the base plate 92 may be glass.

Each photodiode of the photodiode array 90 functions as pixel or detector element (e.g., pixel 60 in FIG. 3). In certain embodiments, some photodiodes of the photodiode array 90 may function as a sub-pixel. Each photodiode of the photodiode array 90 is configured to act as a direct current source to the readout device (e.g., readout device 72 in FIG. 2). The light imager panel lacks both transistors and scan lines. Having each pixel have a dedicated readout channel avoids charge redistribution issues associated with utilizing charge integrating transistors in typical flat panel detectors.

In certain embodiments, each photodiode of the photodiode array 90 is made of amorphous silicon (a-Si). In certain embodiments, where the photodiodes are made of amorphous silicon, a higher bias voltage than the typical bias voltage in the range of 5V to 15V is applied to the photodiodes to reduce lag. In typical flat panel detectors using charge readout, the capacitive coupling between a pixel and a data line is an issue due to the voltages switching when the pixels are readout sequentially. In disclosed embodiments, utilizing the parallel current readout of each photodiode of the photodiode array 90, all photodiodes (pixels) and data lines remain at a virtually constant voltage, thereby eliminating switching noise, as well as trapping and de-trapping currents from the transistors which can be difficult to remove with calibrations. In certain embodiments, each photodiode of the photodiode array 90 is made of N-type metal oxide semiconductor (NMOS).

Figure 7:
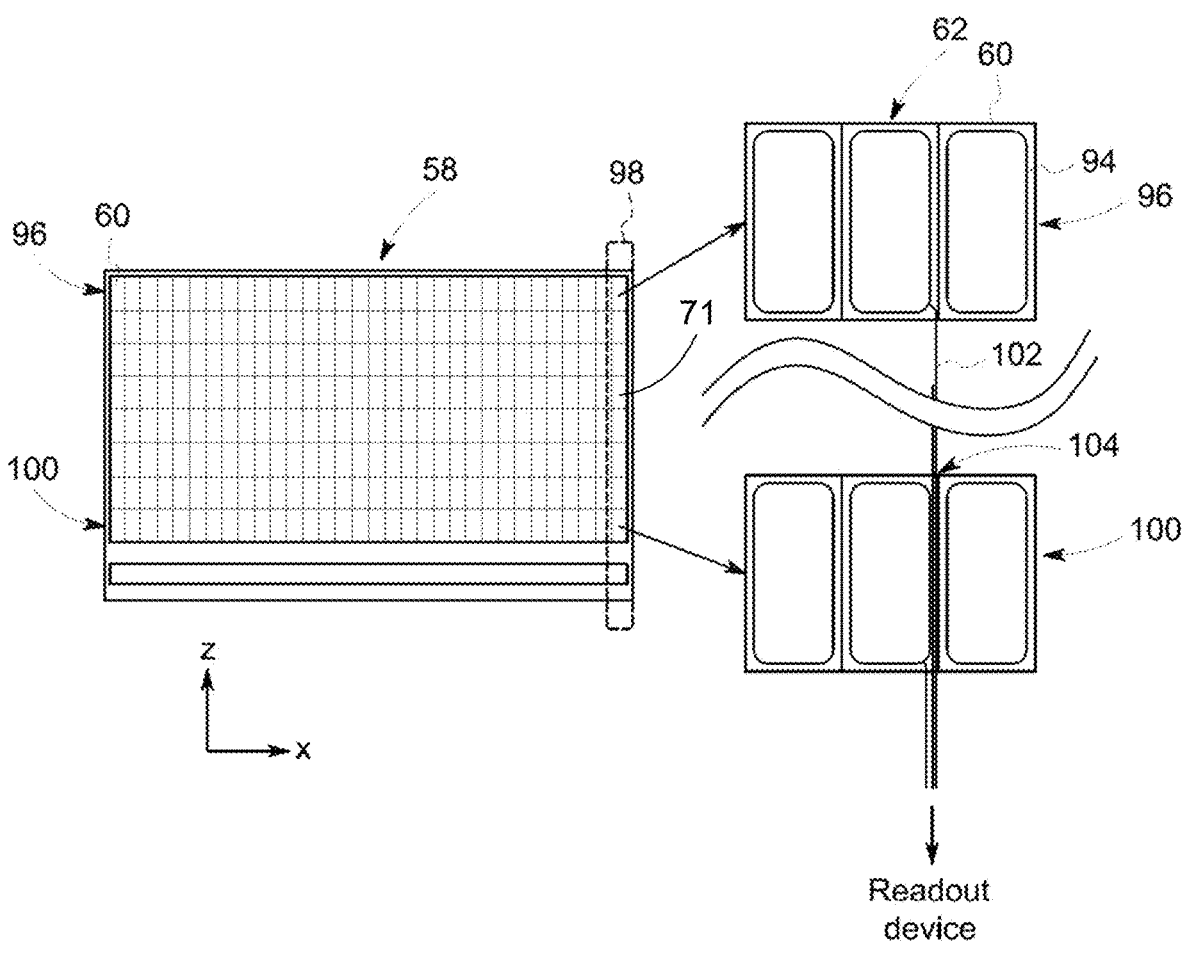
FIG. 7 is a schematic diagram of a top view of the detector module in FIG. 3 without a readout device and a top view of some photodiodes on the detector module (e.g., having traces located in gaps between photodiodes), in accordance with aspects of the present disclosure.

FIG. 7 is a schematic diagram of a top view of the detector module 58 in FIG. 3 without a readout device and a top view of some photodiodes 94 on the detector module 58. The detector module 58 is as described in FIG. 3. A right side of FIG. 7 illustrates a first (e.g., top) row 96 of pixels 60 (e.g., photodiodes 94) located in a top portion of a portion 98 (e.g., dashed box) of the detector module 58 and a second (e.g., bottom) row 100 of pixels 60 (e.g., photodiodes 94) located in a bottom portion of the portion 98. Each photodiode 94 includes a direct line or dedicated data line (e.g., trace) 102 to the readout device (e.g., readout device 72 in FIG. 3). As depicted in FIG. 7, the dedicated data lines 102 for each photodiode 94 in the column 62 run within a gap 104 between the photodiodes 94 (e.g. of adjacent columns 62).

Figure 8:
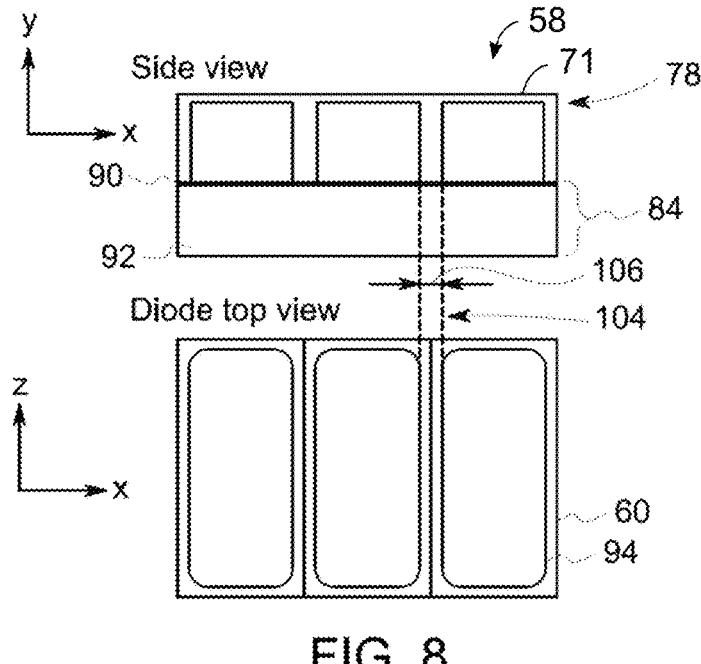
FIG. 8 is a schematic diagram of a side view of a portion of an active area of the detector module and a top view of photodiodes in the portion of the active area, in accordance with aspects of the present disclosure.

FIG. 8 is a schematic diagram of a side view of a portion of the active area 71 of the detector module 58 and a top view of photodiodes 94 in the portion of the active area 71. The active area 71 is as described in FIG. 6. As described above in FIG. 7, the traces or dedicated data lines (e.g., dedicated data lines 102 in FIG. 7) for each photodiode 94 in a column run with the gap 104 between the photodiodes 94. In particular, the traces run underneath (or are hidden underneath) the gap 104 (e.g. kerf) in the scintillator layer 78. In certain embodiments, the gaps 104 in the scintillator layer 78 are located directly underneath collimator blades of the post-patient collimator (e.g., the anti-scatter grid or post-patient collimator 18 in FIG. 1). Thus, the area underneath these gaps 104 is not sensitive to X-rays. In addition, these gaps 104 provide optical isolation. In certain embodiments, each gap 104 may have a width 106 in the range of approximately 5 to 100 micrometers (μm). In certain embodiments, each gap 104 may include a smaller width 106 (e.g., approximately 80 μm). In certain embodiments, each dedicated data line disposed within the gap 104 would utilize a width of approximately 10 μm per line (e.g., 5 μm for the line itself and 5 μm for space).

Figure 9:
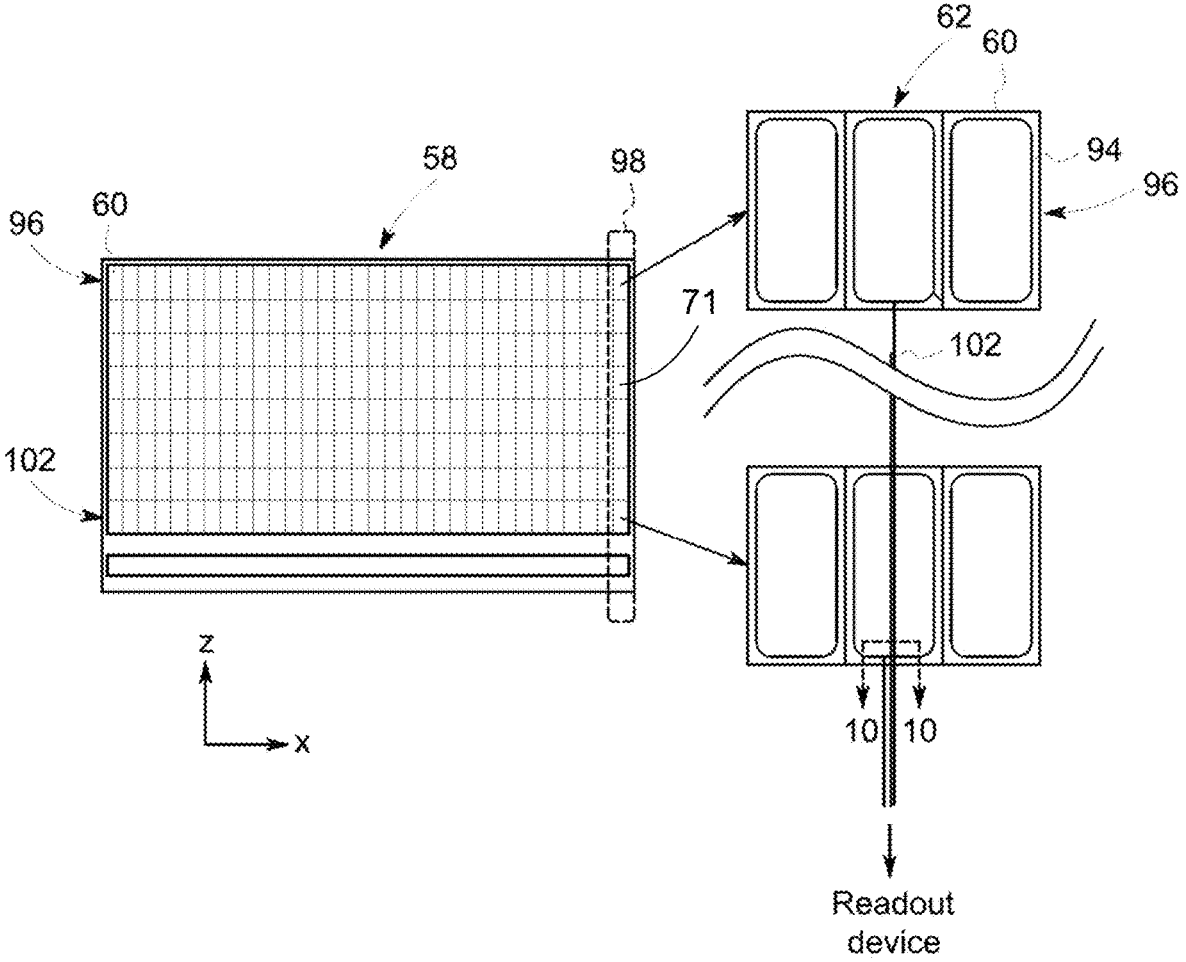
FIG. 9 is a schematic diagram of a top view of the detector module in FIG. 3 without a readout device and a top view of some photodiodes on the detector module (e.g., having traces located underneath the photodiodes), in accordance with aspects of the present disclosure.

As the resolution of the X-ray detector increases, there will be more pixels in the Z-direction for the same coverage and the number of traces required increases. As the smaller gap cannot contain the increased number of traces, it becomes necessary to route the traces underneath the pixels. FIG. 9 is a schematic diagram of a top view of the detector module 58 in FIG. 3 without a readout device and a top view of some photodiodes 94 on the detector module 58 (e.g., having traces located underneath the photodiodes 94). A right side of FIG. 9 illustrates the first (e.g., top) row 96 of pixels 60 (e.g., photodiodes 94) located in the top portion of the portion 98 (e.g., dashed box) of the detector module 58 and the second (e.g., bottom) row 100 of pixels 60 (e.g., photodiodes 94) located in the bottom portion of the portion 98. Each photodiode 94 includes the direct line or dedicated data line (e.g., trace) 102 to the readout device (e.g., readout device 72 in FIG. 3). As depicted in FIG. 9, the dedicated data lines 102 for each photodiode 94 in the column 62 run (i.e., are routed) underneath the photodiodes 94 (e.g., of the column 62 of photodiodes 94 that the dedicated data lines 102 are coupled to) in the Z-direction. Each photodiode 94 includes a via or electrical connection coupling it to a corresponding dedicated data line 102. The dedicated data lines 102 running underneath the photodiodes 94 has no impact on light collection efficiency.

Figure 10:
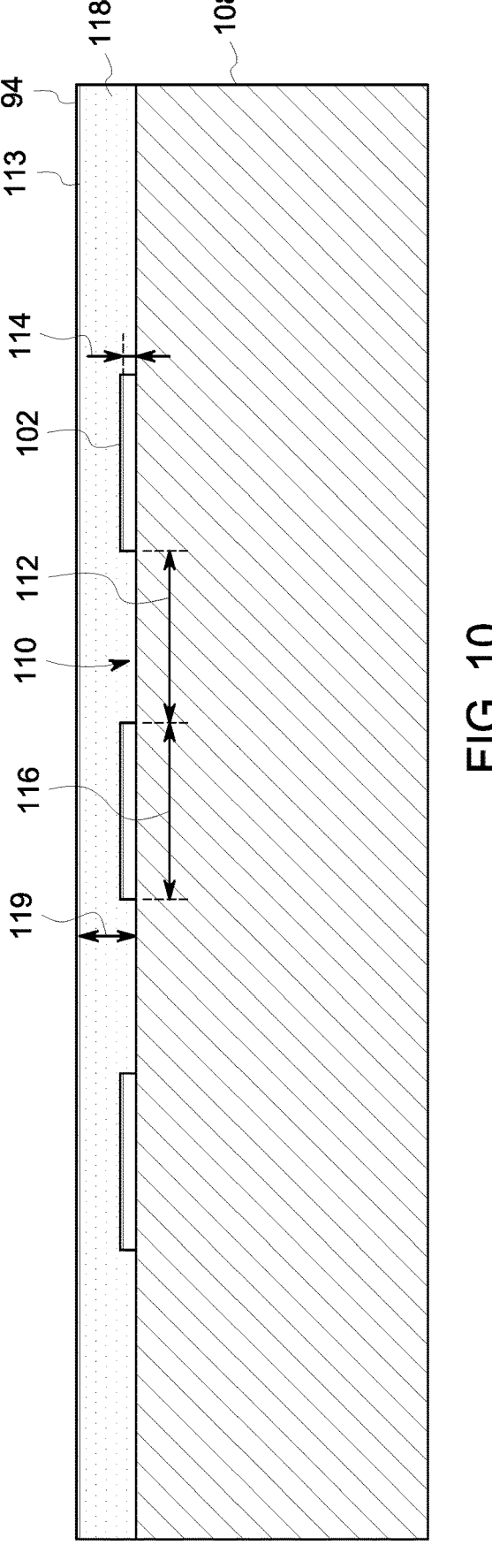
FIG. 10 is a cross-sectional view of the traces in FIG. 9, taken along line 10-10, in accordance with aspects of the present disclosure.

FIG. 10 is a cross-sectional view of the traces or dedicated data lines 102 in FIG. 9, taken along line 10-10. As noted above, the traces 102 are routed underneath the photodiodes 94 (only a conducting layer 113 (e.g., metallic layer) is shown of the photodiode 94 in FIG. 10). As depicted in FIG. 10, the traces 102 are disposed on a semiconductor layer 108. The semiconductor layer 108 may be made of a-Si. Each trace 102 is spaced apart by a gap 110 from an adjacent trace 102. Each gap 110 has a width 112. Each trace 102 includes a height 114 and a width 116. In certain embodiments, a thick layer 118 (e.g., leveling and insulating layer) is disposed over the traces 102. The thick layer 118 has a height 119. The thick layer 118 is disposed between the photodiodes 94 and the traces 102 to reduce capacitive coupling and noise in the traces 102. As depicted in FIG. 10, the thick layer 118 is silicon nitride (which has a high dielectric constant, $\varepsilon_r > 6$). In certain embodiments, a different material may be utilized (e.g., silicon oxide, polyimide (see FIG. 12), or another material) for the thick layer 118.

FIG. 11 is a table 120 relating dimensions of the traces 102 in FIG. 9 to capacitance. In certain embodiments, the width 112 of the gap 110 may be 6 μm. In certain embodiments, the width 112 of the gap 110 may be 3 μm. In certain embodiments, the width 112 of the gap 110 may be different from the dimensions shown in the table 120. In certain embodiments, the height 114 of each trace 102 may be 0.5 μm. In certain embodiments, the height 114 of each trace 102 may be 0.25 μm. In certain embodiments, the height 114 of each trace 102 may be different from the dimensions shown in the table 120. In certain embodiments, the width 116 of each trace 102 may be 6 μm. In certain embodiments, the width 116 of each trace 102 may be 3 μm. In certain embodiments, the width 116 of each trace 102 may be different from the dimensions shown in the table 120. In certain embodiments, a height 119 of thick layer 118 (e.g., silicon nitride) is 2 μm. For the purpose of determining trace capacitance, a trace length of 2 cm was analyzed for each of the different combinations of trace dimensions. As depicted in the table 120, the trace capacitance ranges between 4.9 and 8.6 picofards (pF) for the different combinations of trace dimensions.

Figure 12:
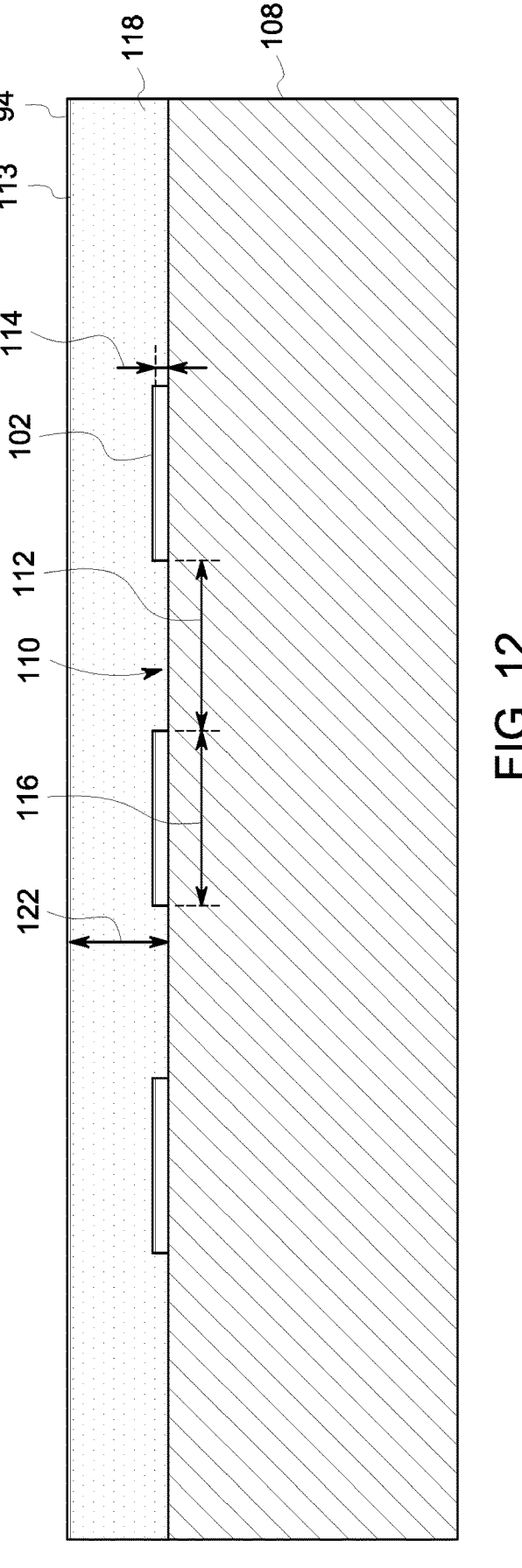
FIG. 12 is a cross-sectional view of the traces in FIG. 9, taken along line 10-10 (e.g., having polyimide disposed over the traces), in accordance with aspects of the present disclosure.

A silicon nitride layer may be deposited as a layer of even thickness but may not be planarizing. Instead, the silicon nitride layer will be conformal, where the top surface topology will mimic the topology of the metal traces underneath (which could lead to lag and leakage in the photodiodes and limit the maximum bias voltage. In addition, a thickness of a silicon nitride layer may be limited (i.e., no greater than 2 μm) which in certain embodiments may limit its effectiveness in reducing capacitive coupling. Thus, in certain embodiments, a polyimide may be utilized instead. Polyimide has a low dielectric constant ($\varepsilon_r$ of approximately 3) and can be much thicker. Thus, the polyimide layer may be more effective at reducing capacitive coupling. A polyimide layer would be planarizing (i.e., the top surface will be flat independent of the topology of the underlying metal traces) resulting in lower leakage and lag and a higher allowable bias voltage. FIG. 12 is a cross-sectional view of the traces or dedicated data lines 102 in FIG. 9, taken along line 10-10. As noted above, the traces 102 are routed underneath the photodiodes 94 (only a conducting layer 113 (e.g., metallic layer) is shown of the photodiode 94 in FIG. 12). As depicted in FIG. 12, the traces 102 are disposed on the semiconductor layer 108. The semiconductor layer 108 may be made of a-Si. Each trace 102 is spaced apart by the gap 110 from an adjacent trace 102. The gap 110 has the width 112. Each trace 102 includes the height 114 and the width 116. In certain embodiments, the thick layer 118 (e.g., leveling and insulating layer) is disposed over the traces 102. The thick layer 118 has a height 122. The thick layer 118 is disposed between the photodiodes 94 and the traces 102 to reduce capacitive coupling and noise in the traces 102. As depicted in FIG. 12, the thick layer 118 is polyimide. The height 122 of the thick layer 118 (e.g., polyimide) in FIG. 12 is greater than the height 119 of the thick layer 118 (e.g., silicon nitride) in FIG. 10. The height 122 of the thick layer 118 of polyimide may be up to 4 μm.

Figure 13:
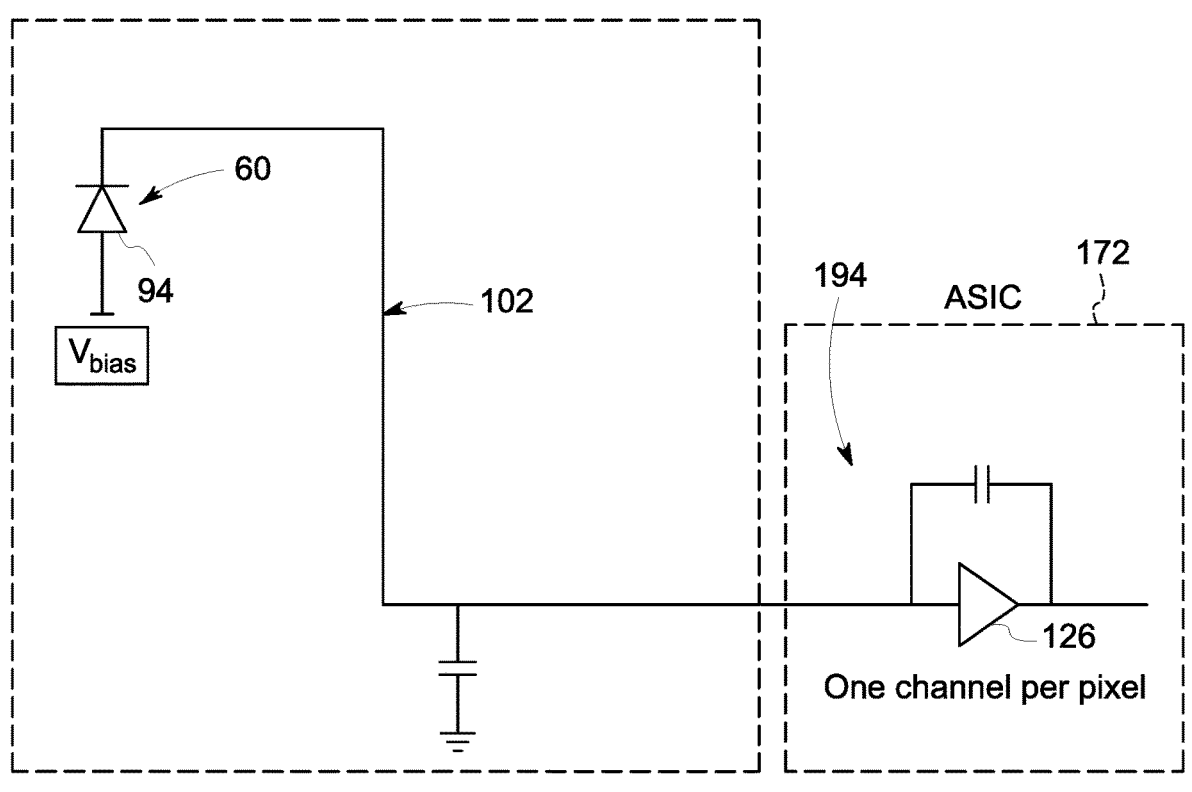
FIG. 13 is schematic diagram of a photodiode coupled to a readout device via a trace, in accordance with aspects of the present disclosure.

As described above, in certain embodiments, each respective dedicated readout channel coupled to a photodiode includes a current integrating amplifier. FIG. 13 is a schematic diagram of a respective photodiode 94 coupled to the readout device 72 via a respective trace 102 (e.g., dedicated data line). Each photodiode 94 of the array of photodiodes in the X-ray detector is coupled to a respective readout channel 124 of the readout device 72 (e.g., ASIC). Each photodiode 94 of the array of photodiodes is configured to act as a direct current source to the readout device 72. The dedicated readout channel 124 includes a current integrating amplifier 126. As configured, the X-ray detector enables a current readout approach to acquiring the image data during a CT scan.

Figure 14:
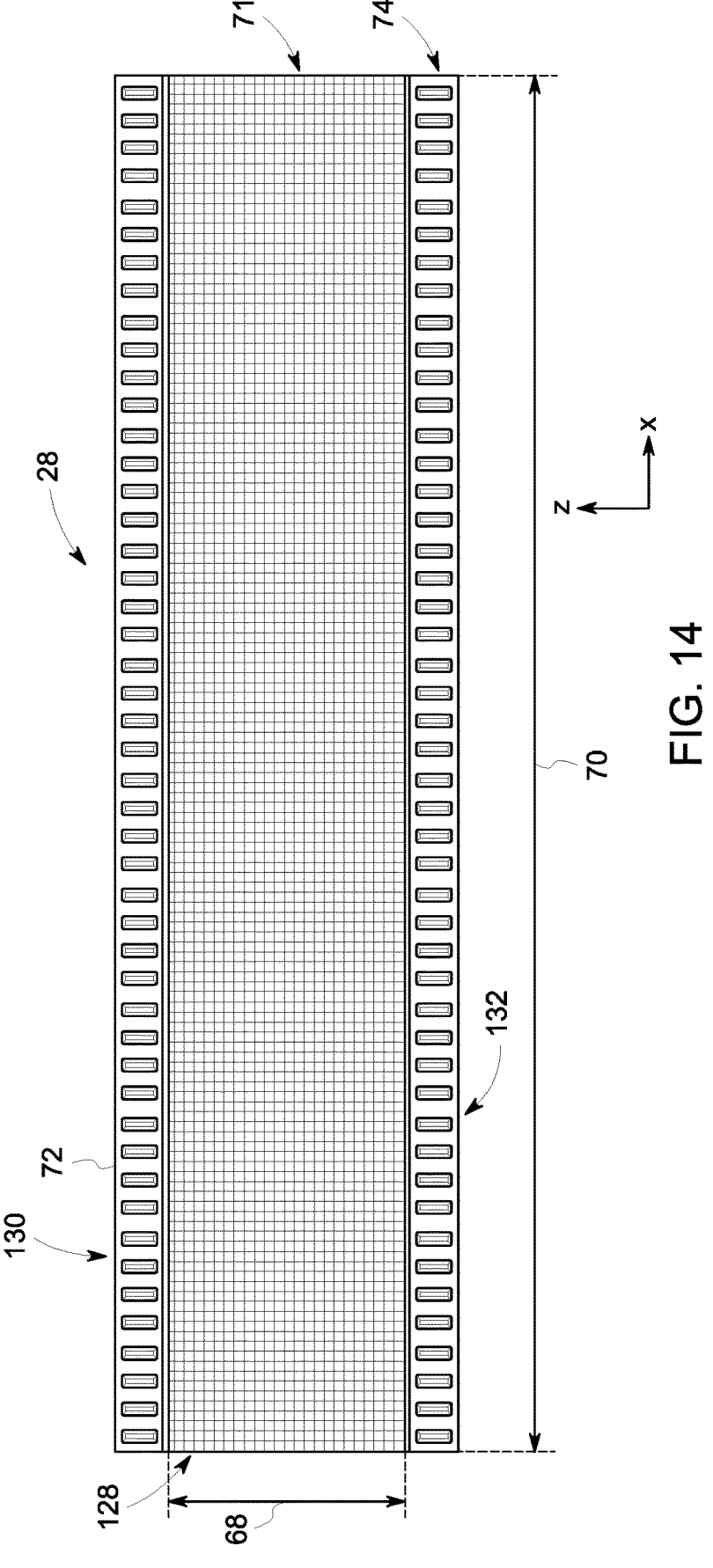
FIG. 14 is a schematic diagram of an X-ray detector having a single imager panel, in accordance with aspects of the present disclosure.

FIG. 14 is a schematic diagram of the X-ray detector 28 having a single imager panel 128. The single imager panel 128 is structurally similar to the X-ray detector modules 58 described above in FIGS. 2-6. The single imager panel 128 includes a plurality of pixels (e.g., detector elements). Each pixel is a photodiode. The single imager panel 128 includes a plurality of columns or channels of the pixels extending in the Z-direction. The single imager panel 128 includes a plurality of rows of the pixels extending in the X-direction. The rows of the pixels of the single imager panel 128 form slices of the X-ray detector 28. In certain embodiments, the single imager panel 128 may enable the direct readout of 64 slices (e.g., with 500 μm wide pixels). In certain embodiments, with even larger pixels, the single imager panel 128 may include more than 64 slices.

The coverage 68 of the single imager panel 128 as depicted in FIG. 14 is defined by the 64 pixels in the Z-direction. A dimension 70 in the X-direction of the single imager panel 128 depicted in FIG. 14 is 40 cm. The coverage 68 and dimension 129 define the active area 71 for the single imager panel 128.

Each pixel of the single imager panel 128 is coupled via a dedicated data line (e.g., metal trace) to a respective dedicated readout channel of a readout electronics or readout device 72 coupled to the single imager panel 128 to enable parallel readout of the pixels. A plurality of the readout devices 72 (e.g., ASICs) are disposed on a first side 130 of the single imager panel 128 and a second side 132 of the single imager panel 128 disposed opposite the first side 130. In certain embodiments (e.g., for an X-ray detector 28 having a smaller coverage (e.g., 32 pixels in the Z-direction)), the ASICs may only be disposed on a single side (e.g., side 130 or side 132) of the image panel 128. In particular, each readout device 72 is coupled to the inactive area 74 of the X-ray detector 28. Each readout device 72 (e.g., ASIC)

may include 256 readout channels for 256 pixels on the single imager panel 128. As each pixel e.g., photodiode) has a dedicated readout channel (e.g., dedicated ASIC channel), the number of readout devices 72 (e.g., ASICs) increases proportionally to the number of pixels. As described above, each readout channel is a current integrating amplifier. Traces of all the pixels adjacent the first side 130 of the single imager panel 128 are routed to readout devices 72 on the same side 130 of the single imager panel 128. Traces of all the pixels adjacent the second side 132 of the single imager panel 128 are routed to readout devices 72 on the same side 132 of the single imager panel 128. In certain embodiments, the traces may be routed underneath the gaps (e.g., kerfs) in the scintillator layer between pixels. In certain embodiments, the traces may be routed underneath the pixels (e.g., photodiodes).

With a dedicated readout (e.g., ASIC) channel per pixel, the number of readout channels grows quickly as resolution increases. To save cost, pixel sizes may vary, and pixels may be binned. Additionally, decreased resolution for outer slices also allows for an increase in coverage when only a fixed number of traces can be routed underneath the pixels. The X-ray detector 28 may be configurable for different configurations. In one configuration, the X-ray detector 28 may include 32 slices with 500 μm pixels. In another configuration, the X-ray detector 28 may include 64 slices with 1000 μm square pixels to provide 4× more coverage than the configuration with 32 slices with 500 μm pixels.

Figure 15:
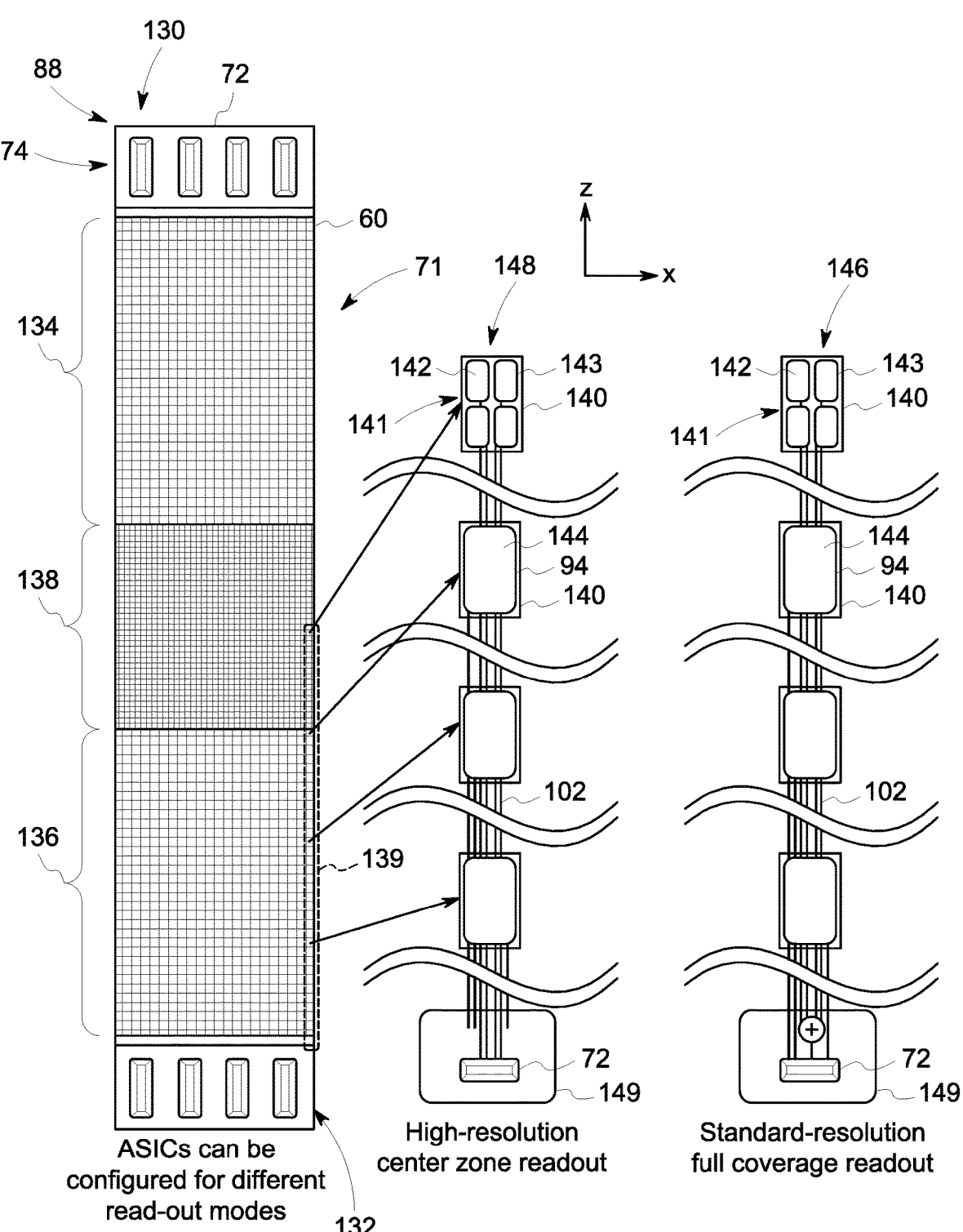
FIG. 15 is a schematic diagram of a portion of the X-ray detector in FIG. 14 having different resolution zones and different readout modes utilized with the X-ray detector, in accordance with aspects of the present disclosure.

Different zones or regions of the X-ray detector 28 may be configured for different resolutions. FIG. 15 is a schematic diagram of a portion of the X-ray detector 28 in FIG. 14 having different resolution zones and different readout modes utilized with the X-ray detector 28. The X-ray detector 28 includes the pixels 60 (e.g., photodiodes 94, 143) divided between a pair of standard resolution zones 134, 136 (e.g., outer zones) and a high-resolution center zone 138. The pair of standard resolution zones 134, 136 flanks the high-resolution center zone 138. Dashed box 139 indicates a portion of the pixels 60 in the high-resolution center zone 138 and the standard resolution zone 136. Multiple photodiodes 143 are disposed in each pixel region or area 140 (as defined by the scintillator) in the high-resolution center zone 138. As depicted, a set 141 of photodiodes 143 (e.g., 4 photodiodes 143) are disposed in each pixel region 140 in the high-resolution center zone 138. In certain embodiments, the number of photodiodes 143 in each pixel region 140 in the high-resolution center zone 138 may be different from that depicted in FIG. 15. A single photodiode 94 is disposed in each pixel region or area 140 in the standard resolution zones 134, 136. Each photodiode 94 has a direct line (e.g., trace 102) to the readout device 72. As depicted in FIG. 15, the traces 102 run underneath the photodiodes 94 due to the number of pixels 60 in the X-ray detector 28. Each photodiode 94 in the standard resolution zones 134, 136 has a larger area 142 than an area 144 of the photodiodes 143 in the high-resolution center zone 138.

The panel of the X-ray detector 28 is configured to be readout at a fixed resolution setting (i.e., either high-resolution center zone readout or standard-resolution full coverage readout). The readout devices 72 (e.g., ASICS) are configured to operate in different readout modes. The readout devices 72 are configured to operate in a first readout mode 146 (e.g., standard-resolution full coverage readout) and in a second readout mode 148 (e.g., high-resolution center zone readout). The configuring (or changing) between different readout modes 146, 148 may be integrated within the readout device 72 or located in a separate device 149. In the first readout mode 146, the pair of standard resolution zones 134, 136 and the high-resolution zone 138 are readout at a same resolution. In the first readout mode 146, each set 141 of photodiodes 143 functions as a single pixel 60. The signals in the traces 102 of the photodiodes 143 in a respective set 141 of photodiodes are combined (e.g., summed) prior the readout device 72 to provide a single signal to a single readout channel. In the second readout mode 148, only the high-resolution zone 138 is readout and it is readout at a higher resolution than the resolution in the first readout mode 146. In the second readout mode 148, each photodiode 143 of each set 141 of photodiodes 143 functions as a separate pixel 60 and is coupled via its respective trace 102 to a separate readout channel in the readout device 72. It should be noted in the high-resolution zone 138, the number of readout channels needs to be at least equal to the number of photodiodes 143. In addition, in the second readout mode 148, there is smaller z-coverage since only the high-resolution zone 138 is being readout. The number of pixels readout and thus the maximum data rate required can then be similar or the same in both the first readout mode 146 and the second readout mode 148. This allows to optimize the other system components, such as the data transmission and data storage.

Figure 16:
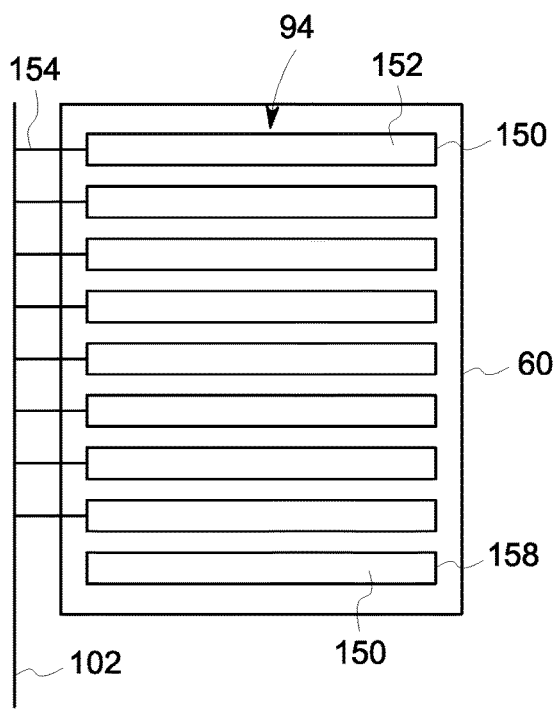
FIG. 16 is a schematic diagram of a repaired pixel (photodiode), in accordance with aspects of the present disclosure.

In certain embodiments, a pixel of the X-ray detector described above may become a bad pixel. In certain embodiments, the bad pixel in the X-ray detector may be repaired. In particular, a diode may be broken up into multiple pieces to function as a sub-pixel. For example, in case of a point defect visible under a microscope, it would be possible to disconnect a portion of the pixel (i.e., the bad portion of the original photodiode). Each of these multiple photodiode pieces may include respective traces or lines that are locally connected together at the edge of the pixel to combine these sub-pixels to form a single functioning repaired pixel. FIG. 16 is a schematic diagram of a repaired pixel 60 (photodiode 94). As depicted, the original photodiode 94 (which was a bad pixel 60) is broken up into multiple photodiode pieces 150. As depicted in FIG. 16, there are 10 photodiodes pieces 150. In certain embodiments, the number of photodiode pieces 150 that the photodiode 94 is broken into may vary. Functioning photodiode pieces 152 are coupled in parallel via respective traces 154 to a single trace 102 at an edge 156 (as depicted in FIG. 16) of the pixel 60. In certain embodiments, the respective traces 154 from the functioning photodiode pieces 152 maybe coupled to the single trace 102 at a different location (e.g., middle or elsewhere). The functioning photodiode pieces 152 are coupled to the single trace 102 in the kerf or another location. Thus, the repair can be done with a minimal dose penalty (e.g., due to the disconnected defective photodiode piece 158). As depicted in FIG. 16, a defective photodiode piece 158 is not coupled with the other photodiode pieces 150 (i.e., functioning photodiode pieces 152) to the single trace 102. In certain embodiments, more than one photodiode piece 150 may be defective and not coupled with the other photodiode pieces 150 to the single trace 102.

Figure 17:
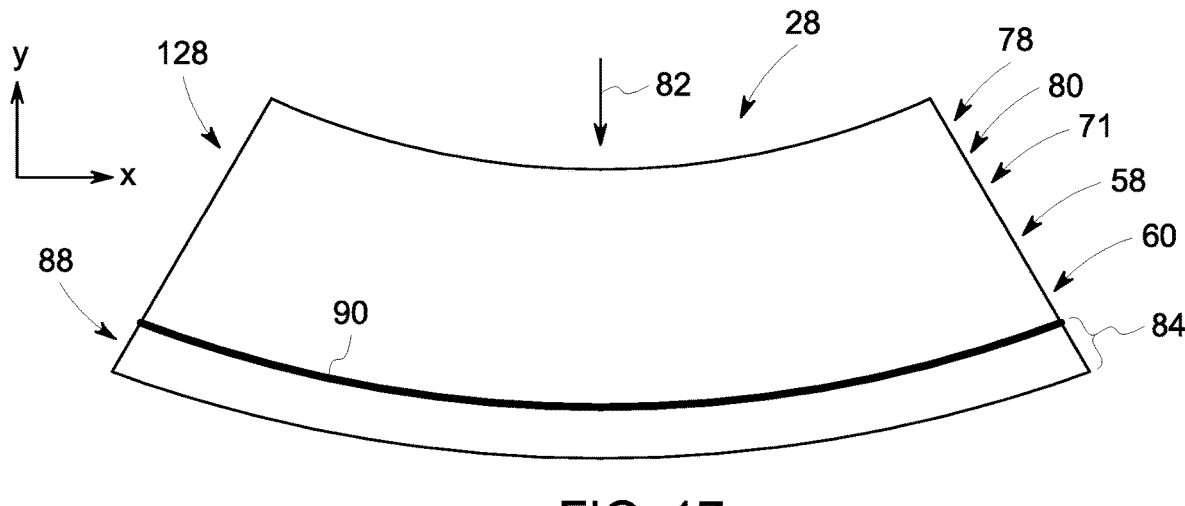
FIG. 17 is a schematic diagram of a side view of an active area of the X-ray detector in FIG. 14 (e.g., curved X-ray detector), in accordance with aspects of the present disclosure.

FIG. 17 is a schematic diagram of a side view of the active area 71 of the X-ray detector 28 in FIG. 14. In particular, the side view is of the single imager panel 128. As depicted, the single imager panel 128 includes a scintillator layer 78 configured to convert X-ray photons into lower energy light photons. The scintillator layer 78 is formed by a crystalline scintillator pack 80. In particular, in certain embodiments, the scintillator pack 80 is made of crystalline gadolinium oxysulfide (GOS).

The scintillator layer 78 is disposed on (e.g., above relative to a direction the X-rays are being received as indicated by arrow 82) the light imager layer 84. The light imager layer 86 is configured to convert the light photons into electrons. The light imager layer 86 includes the light imager panel 88. The light imager panel 88 includes the photodiode array 90 (as part of a semiconductor layer) disposed on (e.g., above) the base plate 92. In certain embodiments, the base plate 92 may be glass.

Each photodiode of the photodiode array 90 functions as pixel or detector element. In certain embodiments, some photodiodes of the photodiode array 90 may function as a sub-pixel. Each photodiode of the photodiode array 90 is configured to act as a direct current source to the readout device. The light imager panel 88 lack both transistors and scan lines. Having each pixel have a dedicated readout channel avoids charge redistribution issues associated with utilizing charge integrating transistors in typical flat panel detectors.

In certain embodiments, each photodiode of the photodiode array 90 is made of amorphous silicon (a-Si). In disclosed embodiments, utilizing the parallel current readout of each photodiode of the photodiode array 90, all photodiodes (pixels) and data lines remain at a virtually constant voltage, thereby eliminating switching noise, as well as trapping any noise from a-Si. In certain embodiments, each photodiode of the photodiode array 90 is made of N-type metal oxide semiconductor (NMOS).

As depicted in FIG. 17, the single imager panel 128 is curved. The single imager panel 128 is curved to match a profile of a gantry rail (where the X-ray detector 28 may be coupled) of a gantry of the CT imaging system so that the detector elements (in particular, the scintillators and their kerfs) are aligned towards the focal spot of the X-ray source (e.g., X-ray tube).

Technical effects of the disclosed embodiments include providing an X-ray detector (e.g., flat panel X-ray detector) for a computed tomography system that costs less while still providing good image quality. The detector architecture of the disclosed embodiments leverages the low cost and high spatial resolution of flat panel X-ray detectors while being comparable to standard computed tomography detector image quality. In particular, a computed tomography scintillator and readout device (e.g., ASIC) is utilized with a flat panel diode array with direct read of the individual diodes in the flat panel. The light imager layer of the X-ray detector also lacks both transistors and scan lines making the X-ray detector about half as complex as a standard X-ray panel.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal languages of the claims.

The invention claimed is:

1. An X-ray detector for a computed tomography (CT) imaging system, comprising:
  a plurality of detector modules, wherein each detector module of the plurality of detector modules comprises:
    a scintillator layer configured to convert X-ray photons into lower energy light photons;
    a light imager layer configured to convert the light photons into electrons, wherein the light imager layer comprises a light imager panel comprising an array of photodiodes having a first side that faces the scintillator layer and a second side opposite the first side; and
    a readout device that converts the electrons into digitized pixel values, wherein each photodiode of the array of photodiodes is coupled to a respective dedicated readout channel of the readout device via a respective dedicated data line, and the readout device is configured to continuously directly readout the electrons from the array of photodiodes, wherein each respective dedicated data line comprises a trace, and one or more traces are located underneath one or more photodiodes on the second side of the array of photodiodes, wherein the readout device is configured to utilize different readout modes to readout the electrons from the array of photodiodes, wherein the array of photodiodes is divided between a pair of standard resolution zones flanking a high-resolution center zone, and wherein the different readout modes comprise a first readout mode where the pair of standard resolution zones and the high-resolution center zone are readout at a same resolution and a second readout mode wherein the high-resolution center zone is readout at higher resolution than in the first readout mode.

2. The X-ray detector of claim 1, wherein each photodiode of the array of photodiodes is configured to act as a direct current source to the readout device.

3. The X-ray detector of claim 1, wherein each photodiode of the array of photodiodes comprises amorphous silicon.

4. The X-ray detector of claim 1, wherein the readout device comprises an application-specific integrated circuit.

5. The X-ray detector of claim 1, wherein each respective dedicated readout channel comprises a current integrating amplifier.

6. The X-ray detector of claim 1, wherein the scintillator layer comprises a scintillator pack comprising crystalline gadolinium oxysulfide.

7. The X-ray detector of claim 1, wherein the readout device is located on a single side of a respective detector module outside a region of the light imager layer and all of the respective dedicated readout channels are routed to the readout device.

8. The X-ray detector of claim 1, wherein one or more traces are located underneath a gap in the scintillator layer.

9. The X-ray detector of claim 1, wherein the light imager panel comprises an insulating layer disposed between the trace and the one or more photodiodes, wherein the insulating layer is configured to reduce capacitive coupling and noise in the trace.

10. The X-ray detector of claim 1, wherein the light imager panel lacks both transistors and scan lines.

11. The X-ray detector of claim 1, wherein each photodiode within each standard resolution zone of the pair of standard resolution zones is configured to function as a single pixel in the first readout mode, and each set of photodiodes within the high-resolution center zone is configured to function as a single pixel in the first readout mode and to be read out as separate pixels in the second readout mode.

12. The X-ray detector of claim 1, wherein each photodiode within each standard resolution zone of the pair of standard resolution zones has a larger area than each photodiode within the high-resolution center zone.

13. The X-ray detector of claim 1, wherein at least one photodiode of the array of photodiodes is a repaired photodiode configured to function as a single pixel, wherein the repaired photodiode comprises a plurality of functioning photodiode pieces coupled together in parallel via respective traces coupled to respective functioning photodiode pieces of the plurality of functioning photodiode pieces and a defective photodiode piece not coupled to the plurality of functioning photodiode pieces.

14. A computed tomography (CT) imaging system, comprising:
  a radiation source configured to emit an X-ray beam; and
  a flat panel X-ray detector, comprising:
    a scintillator layer configured to convert X-ray photons into lower energy light photons;
    a light imager layer configured to convert the light photons into electrons, wherein the light imager layer comprises a light imager panel comprising an array of photodiodes having a first side that faces the scintillator layer and a second side opposite the first side; and
    a plurality of readout devices that converts the electrons into digitized pixel values, wherein each photodiode of the array of photodiodes is coupled to a respective dedicated readout channel of a respective readout device of the plurality of readout devices via a respective dedicated data line, and the plurality of readout devices are configured to continuously directly readout the electrons from the array of photodiodes, wherein each respective dedicated data line comprises a trace, and one or more traces are located underneath one or more photodiodes on the second side of the array of photodiodes, wherein each readout device of the plurality of readout devices is configured to utilize different readout modes to readout the electrons from the array of photodiodes, wherein the array of photodiodes is divided between a pair of standard resolution zones flanking a high-resolution center zone, and wherein the different readout modes comprise a first readout mode where the pair of standard resolution zones and the high-resolution center zone are readout at a same resolution and a second readout mode wherein the high-resolution center zone is readout at higher resolution than in the first readout mode.

15. The CT imaging system of claim 14, wherein each photodiode of the array of photodiodes comprises amorphous silicon and is configured to act as a direct current source to the readout device, and wherein one or more traces is located underneath a gap in the scintillator layer.

16. The CT imaging system of claim 14, wherein the plurality of readout devices comprises a first readout device located on a first side of the X-ray detector and a second readout device located on a second side of the X-ray detector opposite the first side, and a first set of the respective dedicated readout channels is routed to the first readout device and a second set of the respective dedicated readout channels is routed to the second readout device.

17. A flat panel X-ray detector for a computed tomography (CT) imaging system, comprising:

a scintillator layer configured to convert X-ray photons into lower energy light photons;

a light imager layer configured to convert the light photons into electrons, wherein the light imager layer comprises a light imager panel comprising an array of photodiodes having a first side that faces the scintillator layer and a second side opposite the first side, and the light imager panel lacks both transistors and scan line; and a readout device that converts the electrons into digitized pixel values, wherein each photodiode of the array of photodiodes is coupled to a respective dedicated readout channel of the readout device via a respective dedicated data line, and the readout device is configured to continuously directly readout the electrons from the array of photodiodes; and wherein each photodiode of the array of photodiodes comprises amorphous silicon and is configured to act as a direct current source to the readout device, and wherein each respective dedicated data line comprises a trace, and one or more traces are located underneath a gap in the scintillator layer and one or more traces are located underneath one or more photodiodes on the second side of the array of photodiodes; and wherein the readout device is configured to utilize different readout modes to readout the electrons from the array of photodiodes, wherein the array of photodiodes is divided between a pair of standard resolution zones flanking a high-resolution center zone, and wherein the different readout modes comprise a first readout mode where the pair of standard resolution zones and the high-resolution center zone are readout at a same resolution and a second readout mode wherein the high-resolution center zone is readout at higher resolution than in the first readout mode.

* * * * *